(12) United States Patent
Yamanaka et al.

(10) Patent No.: US 6,711,588 B1
(45) Date of Patent: Mar. 23, 2004

(54) FILE MANAGEMENT METHOD FOR FILE SYSTEM

(75) Inventors: Wataru Yamanaka, Tokyo (JP); Mitsuyoshi Kozaki, Tokyo (JP); Hirokazu Takahashi, Kanagawa (JP)

(73) Assignee: NEC Corporation, Tokyo (JP)

( * ) Notice: Subject to any disclaimer, the term of this patent is extended or adjusted under 35 U.S.C. 154(b) by 628 days.

(21) Appl. No.: 09/658,662

(22) Filed: Sep. 8, 2000

(30) Foreign Application Priority Data

Sep. 9, 1999 (JP) .......................................... 11-255082

(51) Int. Cl.$^7$ ............................................... G06F 17/30
(52) U.S. Cl. ........................ 707/104.1; 707/7; 707/200; 713/1
(58) Field of Search ...................... 707/1, 2, 7, 104.1, 707/200; 455/427; 713/1, 2; 365/230.03; 705/28, 14; 386/69, 83

(56) References Cited

U.S. PATENT DOCUMENTS 5,652,885 A * 7/1997 Reed et al. .................... 713/1
5,875,444 A * 2/1999 Hughes ......................... 707/2
6,144,607 A * 11/2000 Sassa ..................... 365/230.03
6,542,739 B1 * 4/2003 Garner ........................ 455/427

* cited by examiner

Primary Examiner—Charles Rones
Assistant Examiner—Hassan Mahmoudi
(74) Attorney, Agent, or Firm—Young & Thompson

(57) ABSTRACT

Disclosed is a file management method for a file system that has a storage device to save data blocks and a main memory of computer, the storage device and the main memory being provided with a management block to save in-use information, in-transition information, and information about expansion to an adjacent data block. The method has the steps of: checking the in-use information of the management block on the main memory when securing a second data block so as to store data relating to a first data block; initializing a management area of the second data block; storing the position of the first data block into the management area of the second data block; storing the position of the second data block into a management area of the first data block; copying the information of the management block on the main memory to the management block on the storage device; and removing the in-transition information.

20 Claims, 8 Drawing Sheets

FILE MANAGEMENT METHOD FOR FILE SYSTEM

FIELD OF THE INVENTION

This invention relates to a file system that the self-repair by file management is allowed during the operation of a computer system, and more particularly to, a file management method for file systems that allows the self-repair during the operation of system even when there occurs an inconsistency due to the stop of system.

BACKGROUND OF THE INVENTION

At present, there are a variety of file systems, such as the UNIX file system, that are used on computers. However, if the system stops when the structure of file system is being changed as in case of addition or removal of file, there may occur an inconsistency in the structure of file system and thereby some access to the file may not be allowed. Also, it is difficult to repair the inconsistency in the structure of file system during the operation of system, therefore many systems need to conduct the repair procedure of file system for a long time before using the file system. Since there are some systems such as a switching exchange system that it is undesirable to do the repair of file system for such a long time during the processing to re-start the system, a file system that the self-repair is allowed even during the operation of system has been desired.

Figure 1:
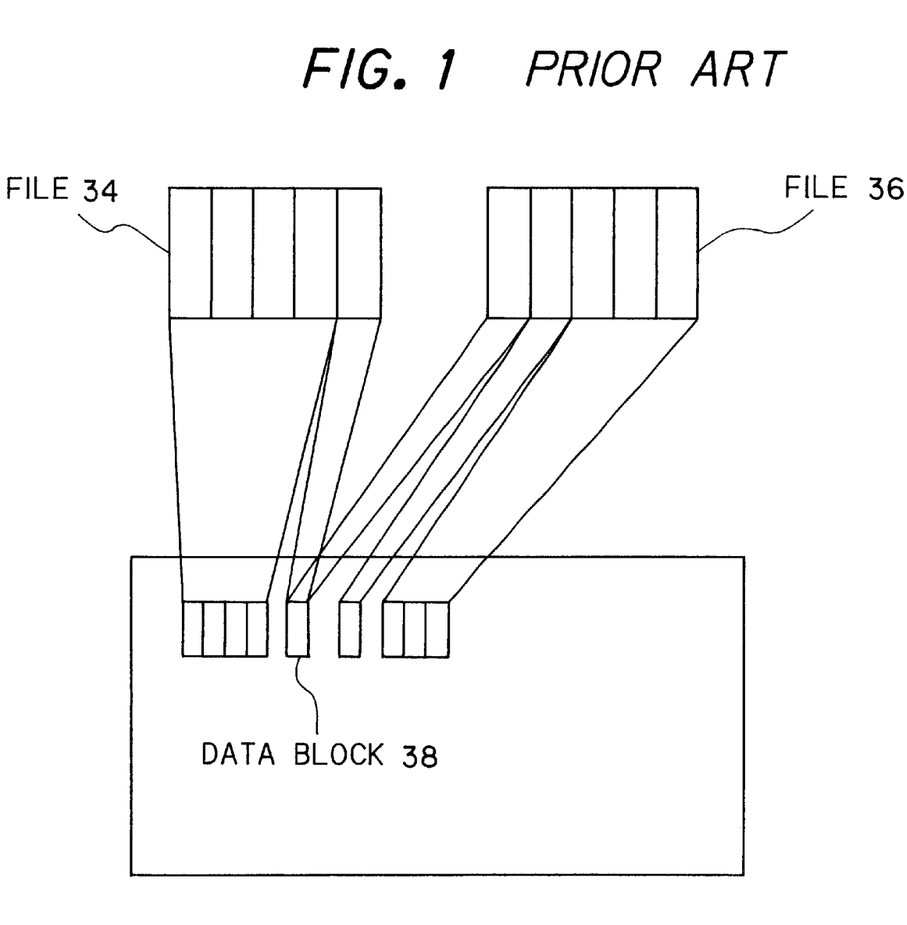
FIG. 1 is a diagram illustrating an inconsistency in the conventional structure of file system.

FIG. 1 illustrates an inconsistency in a conventional structure of file system. For example, files 34, 36 each consist of five data blocks (each of which is composed of multiple physical blocks to retain data). In the file system, it is assumed that file 36 is made after the system re-starts by reason that the system stops when file 34 is being changed. In this case, file 34 and file 36 may use a same data block 38 under the influence of the stop of the system. If the content of file 36 is rewritten while the data block overlaps each other, the content of file 34 must be altered. In such a state, it is impossible to guarantee the content of file. This state is the inconsistency in the structure of file system.

Japanese patent application laid-open No. 10-63555 (1998) discloses a file management method for file system. In the file management method disclosed, its area-allotting block number list always saves the number of a head block of file. In each block of data storage area, data and its next-linked block number or an identifier to represent an empty block is recorded. The file management program allots an additional empty block when adding new data to file.

Thus, when the system re-starts after the file-writing processing is discontinued, the file management program traces a head block number in area and the next block number of each block to an empty block, thereby restoring its file management table.

Some file systems such as the UNIX file system use an area, such as i node (index node), for managing the data block. This i node enables the file system to know the position of a data block. In such a file system, if the system stops when the structure of file system is being changed, there may occur a discordance between a data block on magnetic disk to store data and data block information of the i node for file management. In the conventional file systems, the occurrence of discordance must cause an inconsistency. So, it is necessary for the file system to conduct the repair procedure during the re-start processing of the system in order to solve the inconsistency. However, there is a problem that the repair procedure conducted by the file system takes a considerable time.

Also, in the file management method disclosed in Japanese patent application laid-open No. 10-63555, when re-starting the system, it is required to restore the file processing.

SUMMARY OF THE INVENTION

Accordingly, it is an object of the invention to provide a file management method for file system that allows the self-repair during the operation of system even when there occurs an inconsistency due to the stop of system.

According to the invention, a file management method for a file system that a storage device is provided with a plurality of data blocks to store data, and the storage device and the main memory of a computer is provided with a management block to save in-use information about whether a data block is in use or not, in-transition information about whether the content of data block is being changed or not, and information about whether an adjacent data block is used as a sequential area or not, comprises the steps of:

checking the in-use information of the management block on the main memory when securing a second data block so as to store data relating to a first data block, when an unused area is found, setting the in-transition information of the unused area to be in transition and the in-use information to be in use;

initializing an area to manage a data block in the second data block;

storing the position of the first data block into the area to manage a data block in the second data block;

storing the position of the second data block into an area to manage a data block in the first data block;

copying the information of the management block on the main memory to the management block on the storage device; and removing the in-transition information.

According to another aspect of the invention, a file management method for a file system that a storage device is provided with a plurality of data blocks to store data, and the storage device and the main memory of a computer is provided with a management block to save in-use information about whether a data block is in use or not, in-transition information about whether the content of data block is being changed or not, and information about whether an adjacent data block is used as a sequential area or not, comprises the steps of:

checking the in-use information of the management block on the main memory when storing data continuously into an adjacent area to a data block, when the unused adjacent area is found, setting the in-use information to be in use and information about whether a continuous area is continuously expanded to be continuously expanded;

copying the information of the management block on the main memory to the management block on the storage device; and storing information about up to which position of the area to store data effective data is saved into the area to manage the data block in the data block.

BRIEF DESCRIPTION OF THE DRAWINGS

The invention will be explained in more detail in conjunction with the appended drawings, wherein.

DESCRIPTION OF THE PREFERRED EMBODIMENTS

Figure 2:
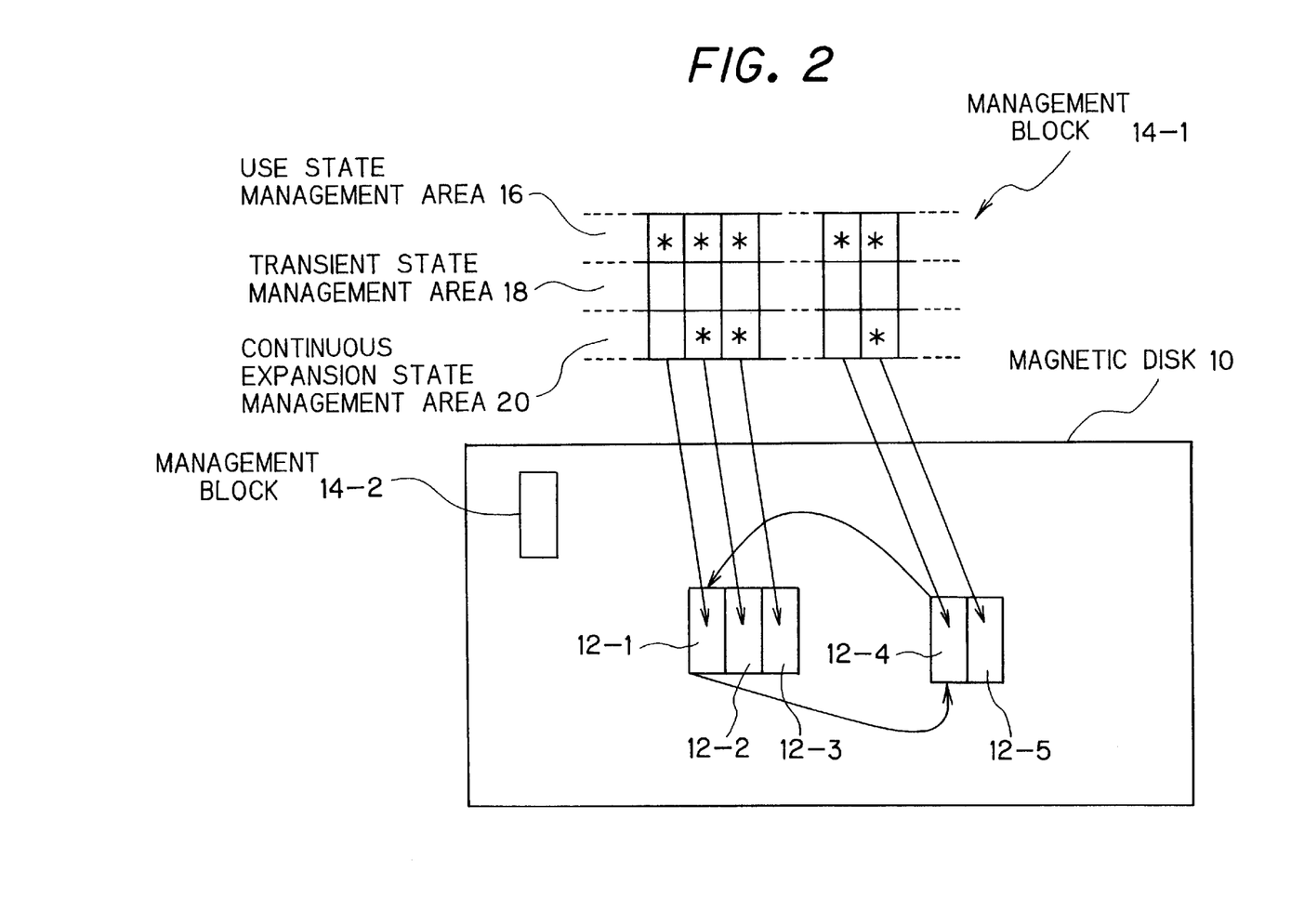
FIG. 2 is a diagram showing components on magnetic disk provided in this invention.

In a file management method for file system according to the invention, as shown in FIG. 2, there are provided data blocks 12 to save data and a management block 14 to manage the status of data blocks 12 by bit map, as components on a magnetic disk 10.

For example, it is assumed that a file to require five data blocks uses data blocks 12-1, . . . , 12-5. Here, its management block indicates that these data blocks are in use. The data blocks 12-1, 12-2 and 12-3 are secured in series. Since the file system confirmed that adjacent data blocks were in use, it was not able to secure further series of blocks. Therefore, the file system saves data using data blocks 12-4 and 12-5 that are located distantly. It is assumed that the data are stored in the order of data blocks 12-1, . . . 12-5, starting from the head part.

In the conventional methods using i node, the position of a data block can be known from the i node, but the position of i node to know the position of a data block cannot be known from the data block (this is called one-way link). Therefore, in these methods, when there occurs an inconsistency in the file system, it is impossible to check whether a data block that will be managed by a certain i node is managed by another i node during the operation of system. Thus, it is required to conduct the repair procedure during the re-start processing of system.

In contrast with this, in the file management method for file system according to the invention, the data block itself also has a management area that saves the position of a data block knowing the position of that data block (this is called two-way link). Thus, data blocks are connected with each other by the two-way link.

Figure 3:
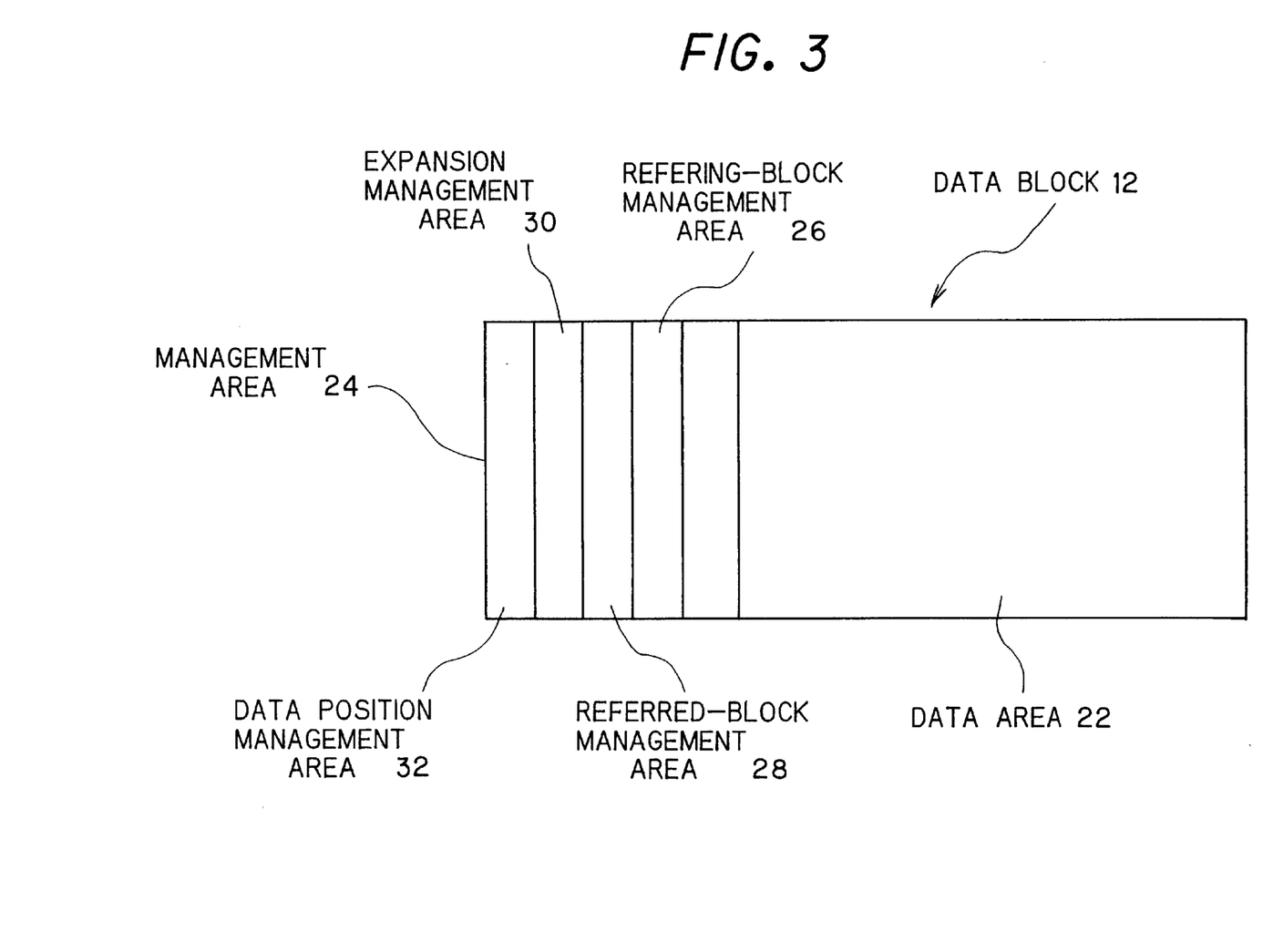
FIG. 3 is a diagram showing a composition of data block according to the invention.
Figure 4:
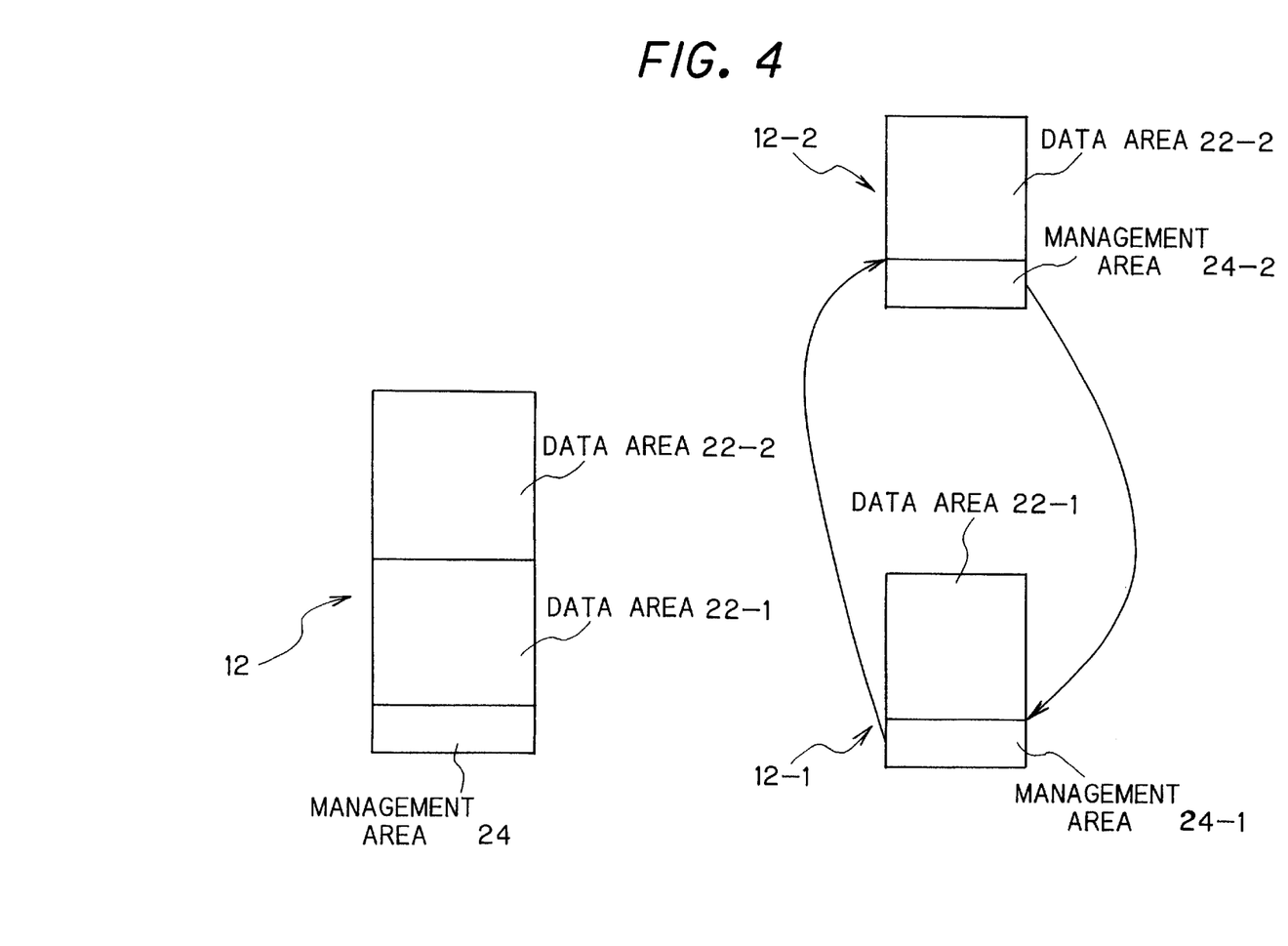
FIG. 4 is a diagram showing a method of securing a data area according to the invention.

The preferred embodiment according to the invention will be explained in detail referring to FIGS. 2 to 4. FIG. 2 is a diagram showing the components on magnetic disk provided in this invention. FIG. 3 is a diagram showing a composition of data block according to the invention. FIG. 4 is a diagram showing a method of securing a data area according to the invention.

Physical blocks on the magnetic disk 10 include the data blocks 12 to save data and the management block 14 to manage the status of data blocks 12 by bit map. The management block 14 is composed of a use state management area 16 to store information about whether a data block 12 to be managed is in use or not, a transient state management area 18 to store information about whether a data block 12 is in transition (being secured or released) or not, and a continuous expansion state management area 20 to store information about whether a data block 12 is secured as one of continuous data blocks. A management block 14-1 corresponds to a management block 14-2 that is copied on a main memory therefrom.

Also, as shown in FIG. 3, the data block 12 is composed of a data area 22 to save file data, and a management area 24 to save information of data block. The management area 24 is composed of a referring-block management area 26 to save the position of a data block (or data blocks) which refers to the data block 12 (i.e., a data block which saves the position of the data block 12), and a referred-block management area 28 to save the position of a data block (or data blocks) to which the data block 12 refers (i.e., a data block whose position is saved by the data block 12).

Also, the file system provides an additional management area by expanding the management area 24 when the management area 24 becomes short of space. Thus, the file system is further composed of an expansion management area 30 to save the position of the additionally-expanded management area (or areas), and a data position management area 32 to store information about which position of data area the end of data is located.

To expand the data block 12, as shown in FIG. 4, there are two ways, one is to expand as one continuous data block and the other is to secure an area at a new place since it is impossible to expand the area continuously.

First, the way of securing a continuous data block is explained. At the beginning, there is the data block 12 composed of a management area 24 and a data area 22-1. After that, as the data increases, it becomes impossible to store the data by only the data area 22-1. In this case, when its next data block (a data block located next to the data area 22-1 viewing from the management area 24) is not used, the file system allots that area as a second data area 22-2 to be managed by the management area 24. The expansion method that one management area thus manages multiple continuous data areas to save data of the same file is called continuous expansion.

Second, the way of securing area at a new place is explained. At the beginning, as shown in FIG. 4, there is the data block 12 composed of a management area 24-1 and a data area 22-1. After that, as the data increases, it becomes impossible to store the data by only the data area 22-1. Here, it is assumed that its next data block is in use and therefore it is impossible to conduct the continuous expansion. In this case, at a new place, a data block 12-2 composed of a management area 24-2 and a data area 22-2 is secured. The expansion method that data of the same file is thus saved is called newly expanded.

Figure 5:
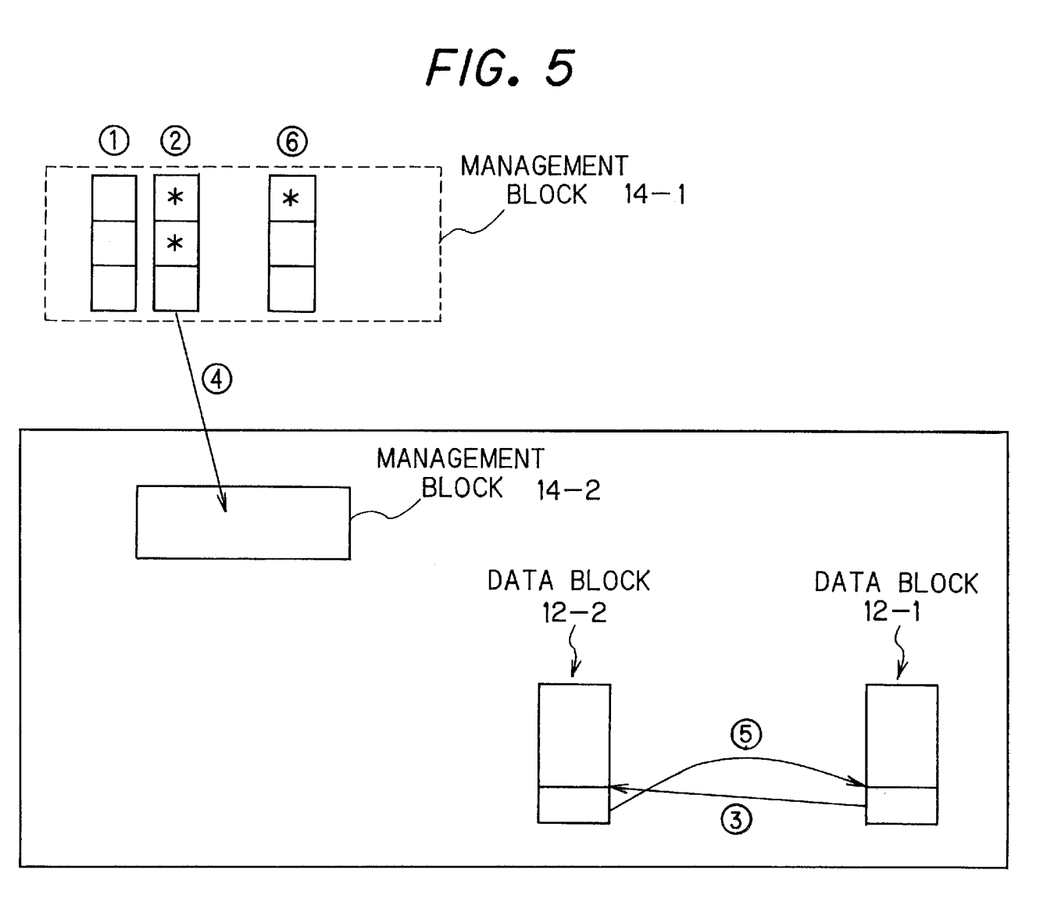
FIG. 5 is a diagram showing an operation that a data block is newly secured according to the invention.
Figure 6:
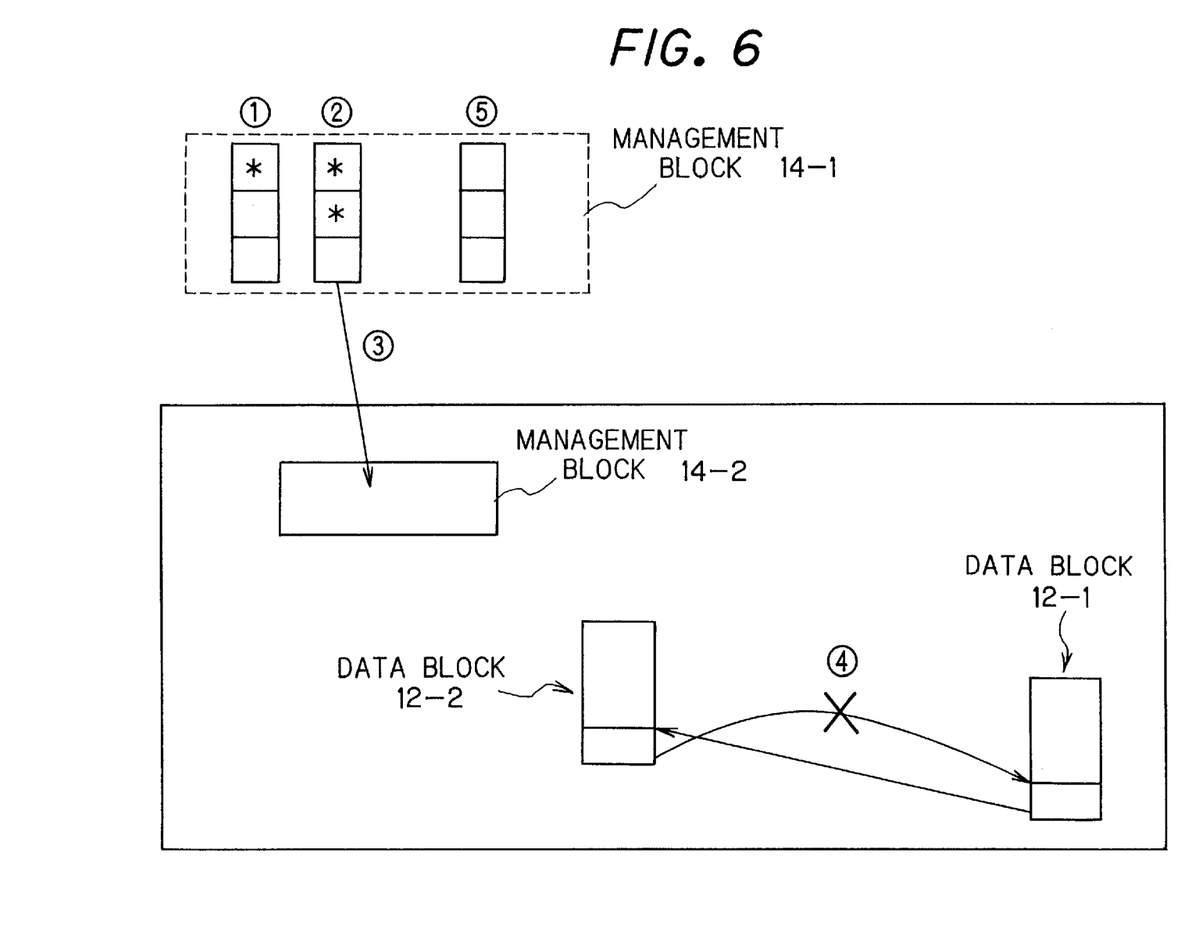
FIG. 6 is a diagram showing an operation that a data block is released according to the invention.
Figure 7:
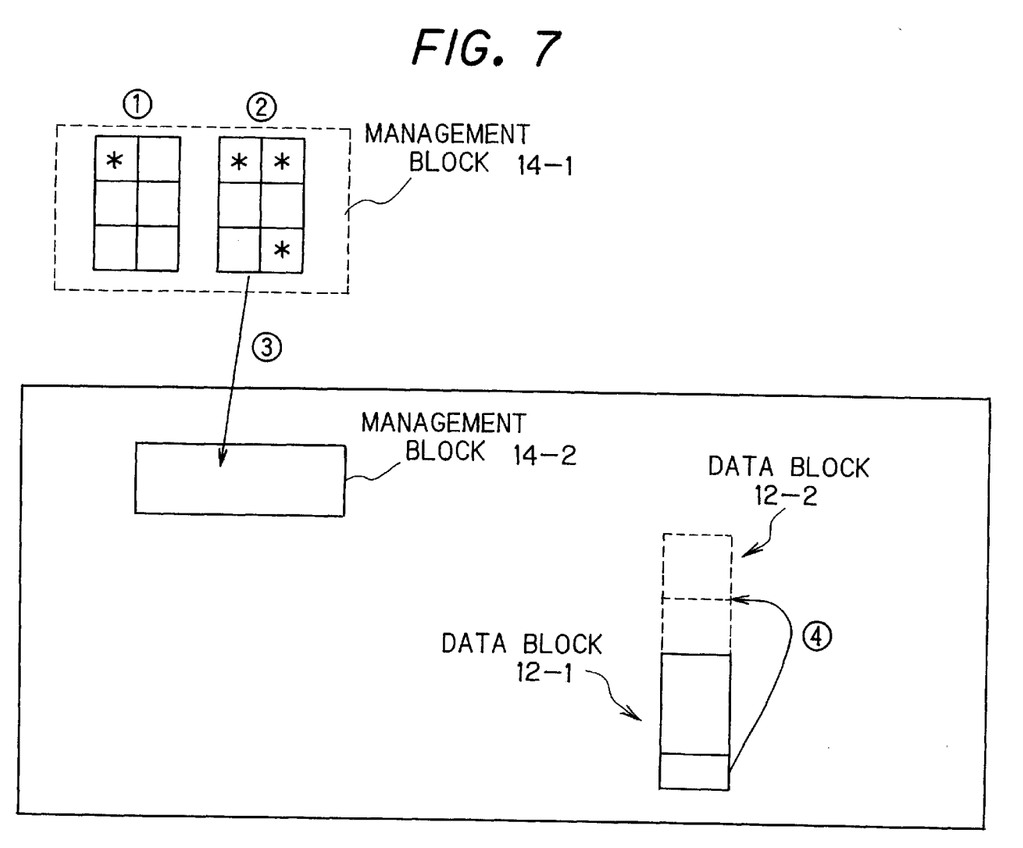
FIG. 7 is a diagram showing an operation that a data block is continuously expanded according to the invention.
Figure 8:
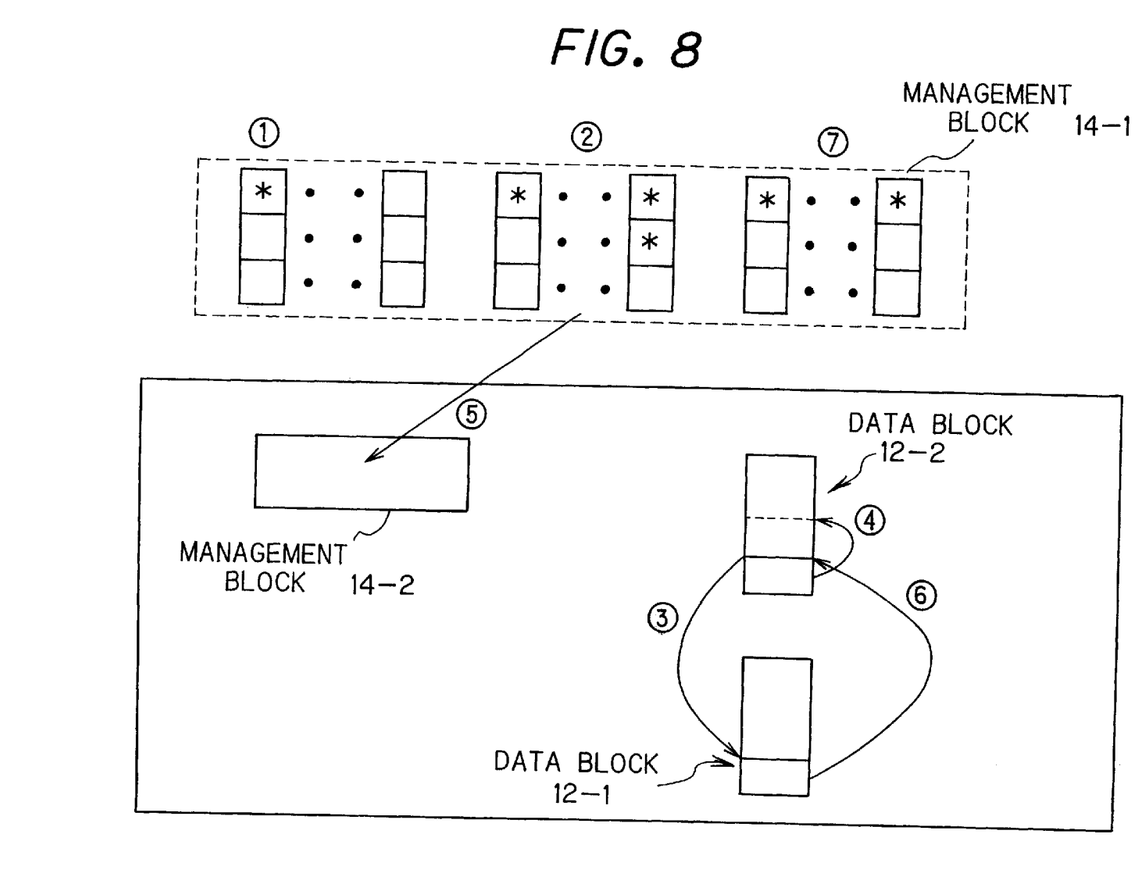
FIG. 8 is a diagram showing an operation that a data block is newly expanded according to the invention.

The operations of the embodiment according to the invention will be explained below referring to FIGS. 5 to 8. FIG. 5 is a diagram showing an operation that a data block is newly secured according to the invention. FIG. 6 is a diagram showing an operation that a data block is released according to the invention. FIG. 7 is a diagram showing an operation that a data block is continuously expanded according to the invention. FIG. 8 is a diagram showing an operation that a data block is newly expanded according to the invention.

The operation to newly secure a data block according to the invention is explained in FIG. 5. Herein, the operation to secure a data block 12-1 is explained. The file system seeks an unused data block based on the use state management area 16 of a management block 14-1 on the main memory (① in FIG. 5). If there is the unused data block 12-1, the file system saves in-use information and in-transition information into positions for managing the data block 12-1 of the use state management area 16 and transient state management area 18, respectively, in the management block 14-1 on the main memory (②) in FIG. 5).

The file system initializes the management area of the data block 12-1, and if there exists a data block 12-2 that will refer to (i.e., save the position of) the data block 12-1, then stores the position of the data block 12-2 into the referring-block management area 26 of the data block 12-1 (③) in FIG. 5). The file system copies the management block 14-1 on the main memory to a management block 14-2 on the magnetic disk 10 ((④) in FIG. 5). Further, if there exists the data block 12-2 that will refer to (i.e., save the position of) the data block 12-1, then the file system stores the position of the data block 12-1 into the referred-block management area 28 of the data block 12-2 ((⑤) in FIG. 5). Finally, it removes the in-transition information from the transient state management area 18 in the management block 14-1 on the main memory ((⑥) in FIG. 5)

The copying of the management block 14-1 on the main memory to the management block 14-2 on the magnetic disk 10 is conducted when the magnetic disk 10 is subject to copying next time or after a certain time passes without being copied. Thereby, the operation to secure the data block can be made faster.

Here, a case that after steps ① and ② in FIG. 5 the system stops is considered. In this case, since only the management block 14-1 on the main memory is changed, after re-starting the system, the management block 14-2 on the magnetic disk 10 is copied onto the main memory. Therefore, there occurs no inconsistency in the structure of file system.

In a case that the system stops after step ③, the fact is only that the management area of the data block 12-1 is initialized and then the data block 12-1 saves the position of the data block 12-2. Therefore, since the management area is initialized again when this data block is secured newly, there occurs no inconsistency in the structure of file system.

In a case that the system stops after step ④, the data block 12-1 is not referred to from any block (i.e., the position of the data block 12-1 is not saved at any block) and, after re-starting the system, it is only impossible for any block to use the data block 12-1. Therefore, there occurs no inconsistency in the structure of file system.

In a case that the system stops after steps ⑤ and ⑥, even when the system operates as is after re-starting the system, there occurs no inconsistency in the structure of file system. Although taken here is the case that the data block 12-1 is referred to by the data block 12-2 (i.e., the position of the data block 12-1 is saved at the data block 12), when no data block refers to the data block 12-1, there occurs no inconsistency in the structure of file system even if the system stops at any step.

The way of restoring an unavailable data block is explained. To restore the state in the case that the system stops after step ④, the management block 14-2 on the magnetic disk 10 is copied onto the main memory after re-starting the system, so that the in-transition information is stored into a position for managing the data block 12-1 in the management block 14-1 on the main memory.

Here, the position of the data block 12-2 is saved in the referring-block management area 26 of the data block 12-1. In this case, when checking the referred-block management area 28 of the data block 12-2 that is saved in the referring-block management area 26 of the data block 12-1, it is known that the position of the data block 12-1 is not saved. Now, by setting the management block 14-1 on the main memory back to the sate of step ①, it comes to the same state as the case that the system stops after step ③ and therefore the restoring is enabled.

To restore the state in the case that the system stops after steps ⑤ and ⑥, the management block 14-2 on the magnetic disk 10 is copied onto the main memory after re-starting the system, so that the in-transition information is stored into a position for managing the data block 12-1 in the management block 14-1 on the main memory.

Here, the position of the data block 12-2 is saved in the referring-block management area 26 of the data block 12-1. In this case, when checking the referred-block management area 28 of the data block 12-2 that is saved in the referring-block management area 26 of the data block 12-1, it is known that the position of the data block 12-1 is saved. Now, by setting the management block 14-1 on the main memory back to the sate of step ⑥, it comes to the state before the system stops and therefore the restoring is enabled.

The operation to release a data block according to the invention is explained in FIG. 6. Herein, an example of releasing a data block 12-1 is explained.

The file system saves in-transition information into a position for managing the data block 12-1 to be deleted of the transient state management area 18 in the management block 14-1 on the main memory (the change from step ① to step ② in FIG. 6). Then, the file system copies the management block 14-1 on the main memory to a management block 14-2 on the magnetic disk 10 ((③) in FIG. 6). If there exists a data block 12-2 that saves the position of the data block 12-1, then the file system deletes the position of the data block 12-1 from the referred-block management area 28 of the data block 12-2 ((④) in FIG. 6). Finally, it removes the stored in-use information from the use state management area 16 and the stored in-transition information from the transient state management area 18 for managing the data block 12-1 in the management block 14-1 on the main memory ((⑤) in FIG. 6)

The copying of the management block 14-1 on the main memory to the management block 14-2 on the magnetic disk 10 is conducted when the magnetic disk 10 is subject to copying next time or after a certain time passes without being copied. Thereby, the operation to secure the data block can be made faster.

Here, a case that after steps ① and ② in FIG. 6 the system stops is considered. In this case, since only the management block 14-1 on the main memory is changed, after re-starting the system, the management block 14-2 on the magnetic disk 10 is copied onto the main memory. Therefore, there occurs no inconsistency in the structure of file system.

In a case that the system stops after step ③, since the data block 12-1 is in use and is therefore not secured newly, there occurs no inconsistency in the structure of file system.

In a case that the system stops after steps ④ and ⑤, the data block 12-1 is not referred to from any block (i.e., the position of the data block 12-l is not saved at any block) and, after re-starting the system, it is only impossible for any block to use the data block 12-1. Therefore, there occurs no inconsistency in the structure of file system.

Although taken here is the case that the data block 12-1 is referred to by the data block 12-2 (i.e., the position of the data block 12-1 is saved at the data block 12), when no data block refers to the data block 12-1, there occurs no inconsistency in the structure of file system even if the system stops at any step.

The way of restoring an unavailable data block is explained. To restore the state in the case that the system stops after step ③, the management block 14-2 on the magnetic disk 10 is copied onto the main memory after re-starting the system, so that the in-transition information is stored into a position for managing the data block 12-1 in the management block 14-1 on the main memory.

Here, if there exists a data block that is saved in the referring-block management area 26 of the data block 12-1, it corresponds to this case. In this case, when checking the referred-block management area 28 of the data block 12-2 that is saved in the referring-block management area 26 of the data block 12-1, it is known that the position of the data block 12-1 is saved. Now, by setting the management block 14-1 on the main memory back to the sate of step ①, it comes to the same state as before the system stops and therefore the restoring is enabled.

To restore the state in the case that the system stops after steps ④ and ⑤, the management block 14-2 on the magnetic disk 10 is copied onto the main memory after re-starting the system, so that the in-transition information is stored into the management block 14-1 on the main memory.

Here, if there exists a data block that is saved in the referring-block management area 26 of the data block 12-1, by checking the referred-block management area 28 of the data block 12-2 that is saved in the referring-block management area 26 of the data block 12-1, it is known that the position of the data block 12-1 is not saved. Now, by setting the management block 14-1 on the main memory to the sate of step ⑤, the restoring is enabled.

The operation to expand continuously a data block according to the invention is explained in FIG. 7. Taken here is a case that a data block 12-1 is expanded continuously to secure a data block 12-2.

First, based on the content of the use state management area 16 in the management block 14-1 on the main memory, it is checked whether any in-use information is not stored for the data block 12-2 next to the data block 12-1 (① in FIG. 7).

If no in-use information is stored, the file system stores in-use information into a position for managing unused data block 12-2 of the use state management area 16 in the management block 14-1 on the main memory, and stores in-continuous-expansion information into a position for managing the data block 12-2 of the continuous expansion state management area 20 (② in FIG. 7).

The file system copies the management block 14-1 on the main memory to the management block 14-2 on the magnetic disk 10 (③ in FIG. 7). Finally, data is saved, and up to which position of the data area effective data is saved is set to the data position management area 32 (④ in FIG. 7). Thereby, the continuous expansion operation of data block can be made faster.

Here, a case that after steps ① and ② in FIG. 7 the system stops is considered. In this case, since only the management block 14-1 on the main memory is changed, after re-starting the system, the management block 14-2 on the magnetic disk 10 is copied onto the main memory. Therefore, there occurs no inconsistency in the structure of file system.

In a case that the system stops after step ③, since the data block 12-2 is substantially managed, as a continuous expansion data block, by the management area of the data block 12-1, there occurs no inconsistency in the structure of file system. Therefore, in conducting the continuous expansion, there occurs no unavailable data block.

The operation to expand newly a data block according to the invention is explained in FIG. 8. Taken here is a case that a data block 12-1 is expanded newly to secure a data block 12-2.

First, based on the content of the use state management area 16 in the management block 14-1 on the main memory, it is checked whether any in-use information is not stored for a data block next to the data block 12-1. If no in-use information is stored, then it is possible to conduct the continuous expansion of data block. Namely, the operation to expand newly the data block is applied to a case that in-use information is stored and therefore it is impossible to expand continuously the data block.

The file system seeks an unused data block based on the use state management area 16 of the management block 14-1 on the main memory (① in FIG. 8). Then, the file system stores in-use information into a position for managing the unused data block 12-2 sought of the use state management area 16 in the management block 14-1 on the main memory, and stores in-transition information into a position for managing the unused data block 12-2 of the transient state management area 18 in the management block 14-1 on the main memory (② in FIG. 8).

The file system initializes the management area of the newly-secured data block 12-2, and saves the position of the data block 12-1 into the referring-block management area 26 of the data block 12-2 (③ in FIG. 8)

The file system saves data into the data block 12-2, and up to which position of the data area effective data is saved is set to the data position management area 32 (④ in FIG. 8). Then, the management block 14-1 on the main memory is copied to the management block 14-2 on the magnetic disk 10 (⑤ in FIG. 8). Then, the file system stores the position of the data block 12-2 into the referred-block management area 28 of the data block 12-1 (⑥ in FIG. 8). Finally, it removes the in-transition information at a position for managing the data block 12-2 of the transient state management area 18 in the management block 14-1 on the main memory (⑦ in FIG. 8).

The copying of the management block 14-1 on the main memory to the management block 14-2 on the magnetic disk 10 is conducted when the magnetic disk 10 is subject to copying next time or after a certain time passes without being copied. Thereby, the operation to secure the data block can be made faster.

Here, a case that after steps ① and ② in FIG. 8 the system stops is considered. In this case, since only the management block 14-1 on the main memory is changed, after re-starting the system, the management block 14-2 on the magnetic disk 10 is copied onto the main memory. Therefore, there occurs no inconsistency in the structure of file system.

In a case that the system stops after step ③, the fact is only that the management area of the data block 12-2 is initialized and then the data block 12-2 saves the position of the data block 12-1. Therefore, since the management area is initialized again when this data block is secured newly, there occurs no inconsistency in the structure of file system.

In a case that the system stops after step ④, although data is saved into the data block 12-2, the data area of the data block 12-1 is not changed. In the management block 14-1 copied onto the main memory after re-starting the system, the data block 12-2 is unused. Therefore, it can be handled similarly to the case of after step ③. So, there occurs no inconsistency in the structure of file system.

In a case that the system stops after step ⑤, since the data block 12-2 is not referred to from any data block (i.e., the position of the data block 12-2 is saved at any data block), after restarting the system it is only impossible to use the data block 12-2. So, there occurs no inconsistency in the structure of file system.

In a case that the system stops after steps ⑥ and ⑦, even when the system operates as is after re-starting the system, there occurs no inconsistency in the structure of file system.

The way of restoring an unavailable data block is explained. To restore the state in the case that the system stops after step ⑤, the management block 14-2 on the magnetic disk 10 is copied onto the main memory after re-starting the system, so that the in-transition information is stored in the management block 14-1 on the main memory.

Here, there is a data block saved in the referring-block management area 26 of the data block 12-2. In this case, when checking the referred-block management area 28 of the data block 12-1 that is saved in the referring-block management area 26 of the data block 12-2, it is known that the position of the data block 12-2 is not saved. Now, by setting the management block 14-1 on the main memory back to the sate of step ①, it comes to the same state as the case that the system stops after step ④ and therefore the restoring is enabled.

To restore the state in the case that the system stops after steps ⑥ and ⑦, the management block 14-2 on the magnetic disk 10 is copied onto the main memory after re-starting the system, so that the in-transition information is stored into a position for managing the data block 12-2 in the management block 14-1 on the main memory.

Here, there is a data block saved in the referring-block management area 26 of the data block 12-2. In this case, when checking the referred-block management area 28 of the data block 12-1 that is saved in the referring-block management area 26 of the data block 12-2, it is known that the position of the data block 12-2 is not saved. Now, by setting the management block 14-1 on the main memory back to the sate of step ⑦, it comes to the state before the system stops and therefore the restoring is enabled.

Meanwhile, it is also possible to conduct the securing and release of data block by combining these basic patterns.

Advantages of the Invention:

In this invention, the data block is managed while being divided into data area and management area, thereby saving information about from which block it is referred to, and the management block to manage the state of data block by bit map is provided. Therefore, even if the system stops when the structure of system is changed, there occurs no inconsistency in the structure of file system.

Also, in this invention, the data block is managed while being divided into data area and management area, thereby saving information about from which block it is referred to, and the management block to manage the state of data block by bit map is provided with the transient state management area, by checking this area part to be restored can be found. Therefore, even if an unavailable data block is yielded in the structure of file system due to the stop of system in changing the structure of system, it can be restored.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A file management method for a file system with a storage device that is provided with a plurality of data blocks to store data, and said storage device and a main memory of a computer are each provided with a management block to save in-use information about whether each data block is in use or not, in-transition information about whether the content of each data block is being changed or not, and information about whether an adjacent data block is used as a sequential area or not, comprising the steps of:

for each prospective second data block, checking said in-use information of the management block on the main memory when securing a second data block so as to store data relating to a first data block, when an unused data block is found, setting the in-transition information of the unused data block to be in transition and the in-use information to be in use, the unused data block becoming the second data block;

initializing an area to manage a data block in said second data block;

storing the position of said first data block into the area to manage a data block in said second data block;

storing the position of said second data block into an area to manage a data block in said first data block;

copying the information of the management block on said main memory to the management block on said storage device; and removing the in-transition information.

2. A file management method for a file system, according to claim 1, wherein:

when securing said second data block, a position indicating an end point of data stored in said second data block is stored into the area to manage the data block.

3. A file management method for a file system, according to claim 1, wherein:

when the file system stops during the operation of securing one other data block or the adjacent area to the first data block, the restoring of the first data block is enabled by copying the management block on said storage device to the management block on said main memory.

4. A file management method for a file system, according to claim 1, wherein:

said data blocks are, in addition to a data area to store data, further provided with a management area to save information about i) the position of another data block to which the concerned data block refers ii) information about the position of yet another data block which refers to the concerned data block, iii) information about a data block management area newly expanded when the data block management area becomes short of space, and iv) information about a position, within the data area to store data, at which an end of data is located; and said concerned data block and said other data block which refers to said concerned data block are connected with each other by two-way link.

5. A file management method for a file system, according to claim 1, wherein:

said data block is managed by the management block that manages the in-use information, in-transition information and continuously-expanded information of data block by bit map.

6. A file management method for a file system, according to claim 1, wherein:

said storage device is a magnetic disk.

7. A file management method for a file system that a storage device is provided with a plurality of data blocks to store data, and said storage device and the main memory of a computer is provided with a management block to save in-use information about whether a data block is in use or not, in-transition information about whether the content of data block is being changed or not, and information about whether an adjacent data block is used as a sequential area or not, comprising the steps of:

checking said in-use information of the management block on the main memory, when storing data continuously from a first data block into an adjacent area of the adjacent data block, and when the unused adjacent area is found, setting the in-use information to indicate being in use and setting the information about whether a continuous area is continuously expanded to indicate being continuously expanded;

copying the information of the management block on said main memory to the management block on said storage device; and     storing information about an end position of a stored data within the adjacent data block area into an area to manage the data block in the first data block.

8. A file management method for a file system, according to claim 7, wherein:

the removal of said adjacent area is enabled by changing the end position information saved in the area to manage the first data block and by removing the information about being continuously expanded in the management block.

9. A file management method for a file system, according to claim 7, wherein:

when the file system stops during the operation of securing one other data block or the adjacent area to the first data block, the restoring of the first data block is enabled by copying the management block on said storage device to the management block on said main memory.

10. A file management method for a file system, according to claim 7, wherein:

said data blocks are, in addition to the data area to store data, further provided with a management area to save information about i) the position of one other data block to which the concerned data block refers, ii) the position of the one other data block which refers to the concerned data block, iii) a data block management area newly expanded when the data block management area becomes short of space, and iv) which position of the data area to store data is an end of data position; and     said concerned data block and said other data block which refers to said concerned data block are connected with each other by two-way link.

11. A file management method for a file system, according to claim 7, wherein:

said data block is managed by the management block that manages the in-use information, in-transition information and continuously-expanded information of data block by bit map.

12. A file management method for a file system, according to claim 7, wherein:

said storage device is a magnetic disk.

13. A file system management method for managing status of data blocks for a file system that includes a main memory and a storage device provided with a plurality of data blocks to store data, comprising the steps of:

providing the main memory with a first management block;

providing the storage device with a second management block,     each of the first and second management blocks comprising record areas for individual data blocks, each of the record areas including i) a use-state management area recording whether or not an associated data block is in use, ii) a transient state management area recording whether or not a content of the associated data block is in a state of being changed, and iii) a continuous expansion state management area recording whether or not an adjacent data block to the associated data block is being used as a sequential data area to the associated data block.

14. The method of claim 13, comprising the further steps of:

having, in the main memory first management block, a first record area for a first data block, the use-state management area of the first record area recording that the first data block is in use;

locating a second data block to store data relating to the first data block, by checking, in the main memory first management block, the use-state management area of record areas corresponding to other data blocks to find a second record area whose use-state management area records an unused data block, the second data block being the associated data block of the second record area;

upon finding the second record area, setting the transient state management area of the second record area to record that the content of the second data block is being changed, and setting the use-state management area of the second record area to record that the second data block is in use;

initializing a portion of the second data block as a second data block management area;

storing a position of the first data block in the second data block management area;

storing a position of the second data block in a first data block management area located within a portion of the first data block;

copy information from the first and second record areas, for the first and second data blocks, from the main memory first management block to the storage device second management block; and     setting the transient state management area of the second record area to record that the content of the second data block not being in a state of change.

15. The method of claim 14, wherein, the second data block management area is initialized to include i) a data position management area to record an end position of data stored within the second data block, ii) a referring block management area to record a position of a referring data block, and iii) a referred-block management area to record a position of a referred-to data block,     the position of the first data block is recorded in the referring data block of in the second data block management area,     a position of a third data block is recorded in the referred-block management area of the second data block management area, and     the first data block is allocated to stored a first portion of a data file, the second data block is allocated to stored a second contiguous portion of the data file, and the third data block is allocated to stored a third contiguous portion of the data file.

16. The method of claim 15, wherein, second data block management area is further initialized to include an expansion management area to record a position of an additionally-expanded management area of the second data block, and the storage device second management block is provided on a physical block of a magnetic disk, the storage device second management block managing status of the data block by bit map.

17. The method of claim 15, wherein, the storage device second management block is provided on a physical block of a magnetic disk, when the second data block management area become short of space, the second data block management area is further initialized to include an expansion management area to record a position of an additionally-expanded management area of the second data block, storing a position of the new data block in the expansion management area of the second data block management area;

storing a position of the second data block in a referring block management area of the new data block, the new data block serving as the additionally-expanded management area of the second data block.

18. The method of claim 13, wherein, a portion of the first data block has been initialized as a first data block management area and includes i) a data position management area to record an end position of stored data, ii) a referring block management area to record a position of a referring data block, and iii) a referred-block management area to record a position of a referred-to data block, and comprising the further steps of:

for storing a first portion of a data file contiguously with a second portion of the data file, verifying that a third block physically adjacent to the first block is available for storing the second portion of the data file by checking, in the main memory first management block, the use-state management area of a third record area corresponding to the third data block to verify the third data block is not in use;

upon verifying the third record area is not in use, setting the continuous expansion state management area of the third record area to record that the third data block is being used as a sequential data area to the first data block, and setting the use-state management area of the third record area to record that the third data block is in use;

copy information from the first and third record areas, for the first and third data blocks, from the main memory first management block to the storage device second management block; and storing, in the data position management area of the first data block management area, a position indicating an end position of the second portion of the data file.

19. The method of claim 18, comprising the further step of changing the third data block from being a contiguous expansion area of the first data block by setting the continuous expansion state management area of the third record area to record that the third data block is not being used as a sequential data area to the first data block, and changing, in the data position management area of the first data block management area, the position indicating the end position of the second portion of the data file.

20. The method of claim 13, comprising the further sequential steps of:

a) having, in the main memory first management block, a first record area for a first data block, a use-state management area of the first record area recording that the first data block is in use, and having the storage device second management block provided on a physical block of a magnetic disk;

b) locating a second data block to store data relating to the first data block, by checking, in the main memory first management block, the use-state management area of record areas corresponding to other data blocks to find a second record area whose use-state management area records an unused data block, the second data block being the associated data block of the second record area;

c) upon finding the second record area, setting the transient state management area of the second record area to record that the content of the second data block is being changed, and setting the use-state management area of the second record area to record that the second data block is in use;

d) initializing a portion of the second data block as a second data block management area;

e) when the first data block management area becomes short of space, initializing the second data block management area to include an expansion management area to record a position of an additionally-expanded management area of the first data block;

f) storing a position of the new data block in the expansion management area of the first data block management area;

g) storing a position of the first data block in a referring block management area of the new data block, the new data block serving as the additionally-expanded management area of the first data block;

h) storing a position of the second data block in a referred block management area of the additionally-expanded management area of the first data block;

i) copy information from the record areas, for the data blocks, from the main memory first management block to the storage device second management block; and j) setting the transient state management area of the second record area to record that the content of the second data block hot being in a state of change.

\* \* \* \* \*